(12) United States Patent
Bleijendaal et al.

(10) Patent No.: US 12,414,646 B2
(45) Date of Patent: Sep. 16, 2025

(54) BEVERAGE EXTRACTING DEVICE

(71) Applicant: Bravilor Bonamat B.V., Heerhugowaard (NL)

(72) Inventors: Luuk Bleijendaal, Heerhugowaard (NL); Merlijn Welkamp, Heerhugowaard (NL)

(73) Assignee: Bravilor Bonamat B.V., Heerhugowaard (NL)

( * ) Notice: Subject to any disclaimer, the term of this patent is extended or adjusted under 35 U.S.C. 154(b) by 693 days.

(21) Appl. No.: 17/860,329

(22) Filed: Jul. 8, 2022

(65) Prior Publication Data

US 2022/0338666 A1 Oct. 27, 2022

Related U.S. Application Data

(63) Continuation of application No. PCT/NL2020/050775, filed on Dec. 11, 2020.

(30) Foreign Application Priority Data

Jan. 10, 2020 (NL) ..................................... 2024645

(51) Int. Cl.
*A47J 31/40* (2006.01)
*A47J 31/52* (2006.01)

(52) U.S. Cl.
CPC .............. *A47J 31/401* (2013.01); *A47J 31/52* (2013.01)

(58) Field of Classification Search
CPC .......... A47J 31/401; A47J 31/52; A47J 31/02; A47J 31/4482; A47J 31/4485; A47J 31/60;
(Continued)

(56) References Cited

U.S. PATENT DOCUMENTS

| 4,998,462 A | 3/1991 | Sekiguchi |
| 2007/0037279 A1* | 2/2007 | Courtois ................ C12M 29/06 435/325 |

(Continued)

FOREIGN PATENT DOCUMENTS

| JP | 2005160649 A | 6/2005 |
| NL | 2022775 B1 | 9/2020 |

(Continued)

*Primary Examiner* — Phuong T Nguyen
(74) *Attorney, Agent, or Firm* — Peacock Law P.C.; Justin R. Muehlmeyer; Daniel Berenger-Russell

(57) ABSTRACT

A beverage extracting device including a vessel for receiving and mixing a powder material and hot liquid, a filter beneath the vessel, an electrical gas pump that connects through a duct to the vessel for supply-ing pressurized gas into the vessel, and an outlet for extracted liquid at an outlet side of the filter which is opposite to the vessel. The outlet connects to an outlet duct for the extracted liquid. A current sensing circuit connects to a power line of the electrical gas pump for monitoring an electrical current through the electrical gas pump. The current sensing circuit is connected to a controller for detecting whether the electrical current is above a preestablished threshold. The controller is arranged to reduce power supplied to the electrical gas pump when the controller establishes that the electrical current through the electrical gas pump is above the preestablished threshold.

6 Claims, 4 Drawing Sheets

(58) Field of Classification Search
CPC ........ A47J 31/469; A47J 31/061; A47J 45/10; A47J 36/10
USPC .......................... 99/279, 290, 293, 295, 323
See application file for complete search history.

(56) References Cited

U.S. PATENT DOCUMENTS

2016/0058241 A1    3/2016    Tsutsumi et al.
2019/0223652 A1*    7/2019    Ford ..................... A47J 31/408

FOREIGN PATENT DOCUMENTS

| WO | 8802612 A1 | 4/1988 |
| WO | 2010059251 A1 | 5/2010 |
| WO | 2021141487 A1 | 7/2021 |

\* cited by examiner

BEVERAGE EXTRACTING DEVICE

CROSS-REFERENCE TO RELATED APPLICATIONS

This application is a continuation of International Patent Application No. PCT/NL2020/050775, titled "Beverage Extracting Device", filed on Dec. 11, 2020, which claims priority to and the benefit of Netherland Patent Application No. 2024645, titled "Beverage Extracting Device", filed on Jan. 10, 2020, and the specification and claims thereof are incorporated herein by reference.

BACKGROUND OF THE INVENTION

Field of the Invention

The invention relates to a beverage extracting device at least comprising a vessel for receiving and mixing a powder material and hot liquid, a filter beneath the vessel, an electrical gas pump that connects through a duct to the vessel for supplying pressurized gas into the vessel, and an outlet for extracted liquid at an outlet side of the filter which is opposite to the vessel, wherein the outlet connects to an outlet duct for the extracted liquid.

Background Art

A beverage extracting device is described in applicant's Dutch patent application 2022775, filed on Mar. 20, 2019.

Discussion of references cited herein is given for more complete background and is not to be construed as an admission that such publications are prior art for patentability determination purposes.

BRIEF SUMMARY OF THE INVENTION

One object of the present invention is to avoid sputtering or splashing at the outlet opening of the outlet duct when nearly all liquid has been expelled from the vessel.

According to an embodiment of the present invention, a beverage extracting device is proposed with the features of one or more of the appended claims.

According to one embodiment of the invention, a current sensing circuit connects to a power line of the electrical gas pump for monitoring an electrical current through the electrical gas pump, and that the current sensing circuit is directly connected to a controller for detecting whether the electrical current is above a preestablished threshold, and that the controller is arranged to reduce power supplied to the electrical gas pump when the controller establishes that the electrical current through the electrical gas pump is above the preestablished threshold. In another embodiment, it is also possible to separate the detection functionality from the controller. In that case the current sensing circuit is first connected to a detector for detecting whether the electrical current is above a preestablished threshold, and the detector is then connected to a controller for the electrical gas pump, which controller is arranged to reduce power supplied to the electrical gas pump when the detector establishes that the electrical current through the electrical gas pump is above the preestablished threshold.

The inventor has found that the rise of the electrical current through the electrical gas pump is a reliable measure for the situation that nearly all liquid has been expelled from the vessel, which is the moment that sputtering or splashing occurs at the outlet opening of the outlet duct. Therefore it is possible to avoid sputtering or splashing when the electrical current rises above a certain threshold and then smoothly reducing the power supplied to the electrical gas pump.

Preferably the detector/controller is arranged to establish an average current level through the electrical gas pump that corresponds with an operation of the device wherein the vessel is still filled with liquid, and liquid is still regularly pouring out of the outlet duct, and that the preestablished threshold is determined depending on the level of said average current level. In this manner a relative measure rather than an absolute measure is introduced into the beverage extracting device of the invention, which automatically takes a possible level of contamination of the filter into account, which may be responsible for the power requirements of the electrical gas pump and which would otherwise deteriorate the adequacy of the response of the controller to the electrical power requirements of the electrical gas pump.

Suitably the preestablished threshold is set at a value of at least 10% above the average current level through the electrical gas pump.

It may further be desirable that the controller comprises a timer to shut off the electrical gas pump after a preestablished time period of operation. This avoids that the electrical gas pump keeps on running when a threshold value for shutting off the electrical gas pump cannot be established.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
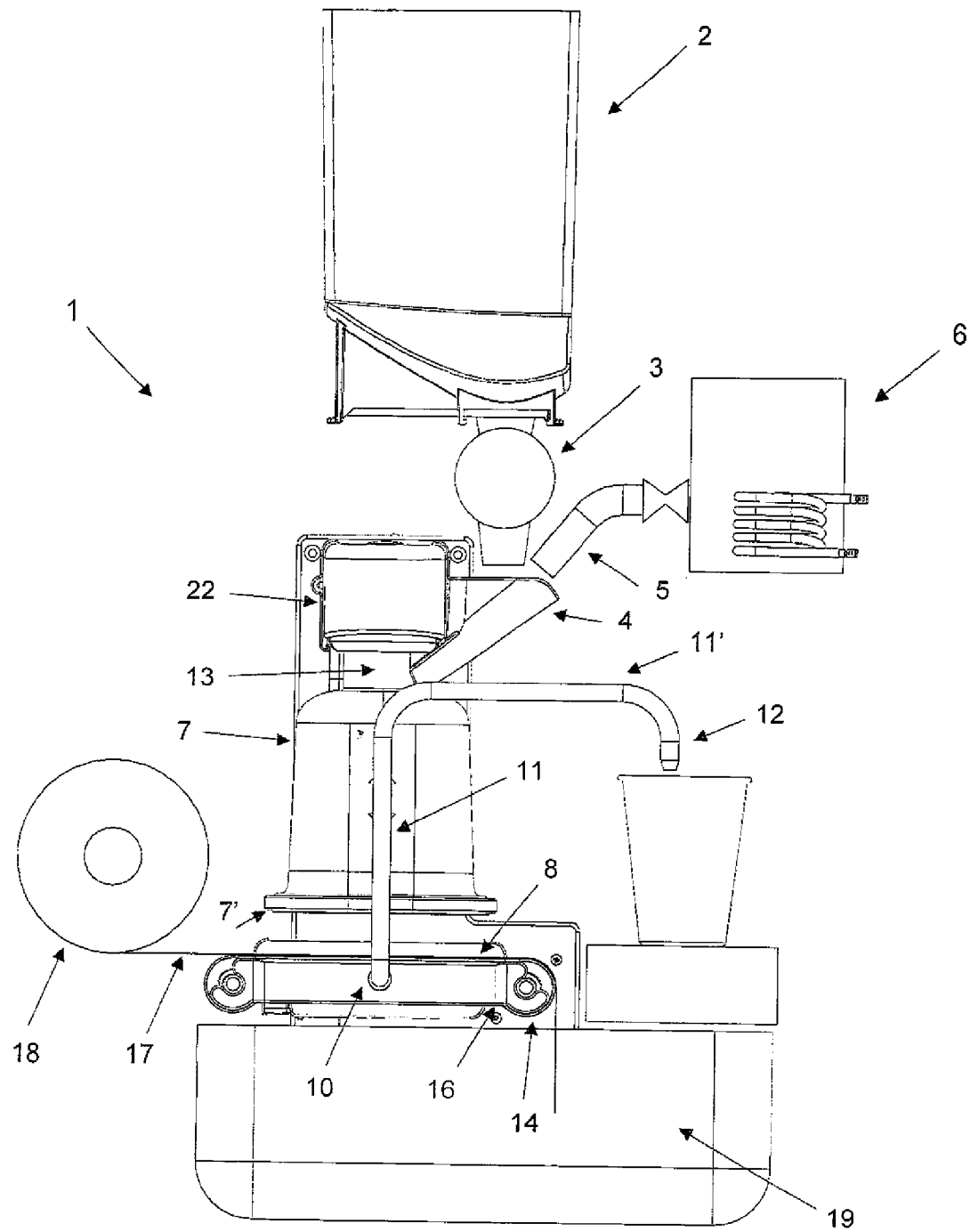
FIG. 1 is an illustration from a frontal view of an embodiment of the beverage extracting device of the present invention.

Whenever in the figures the same reference numerals are applied, these numerals refer to the same parts.

Figure 2:
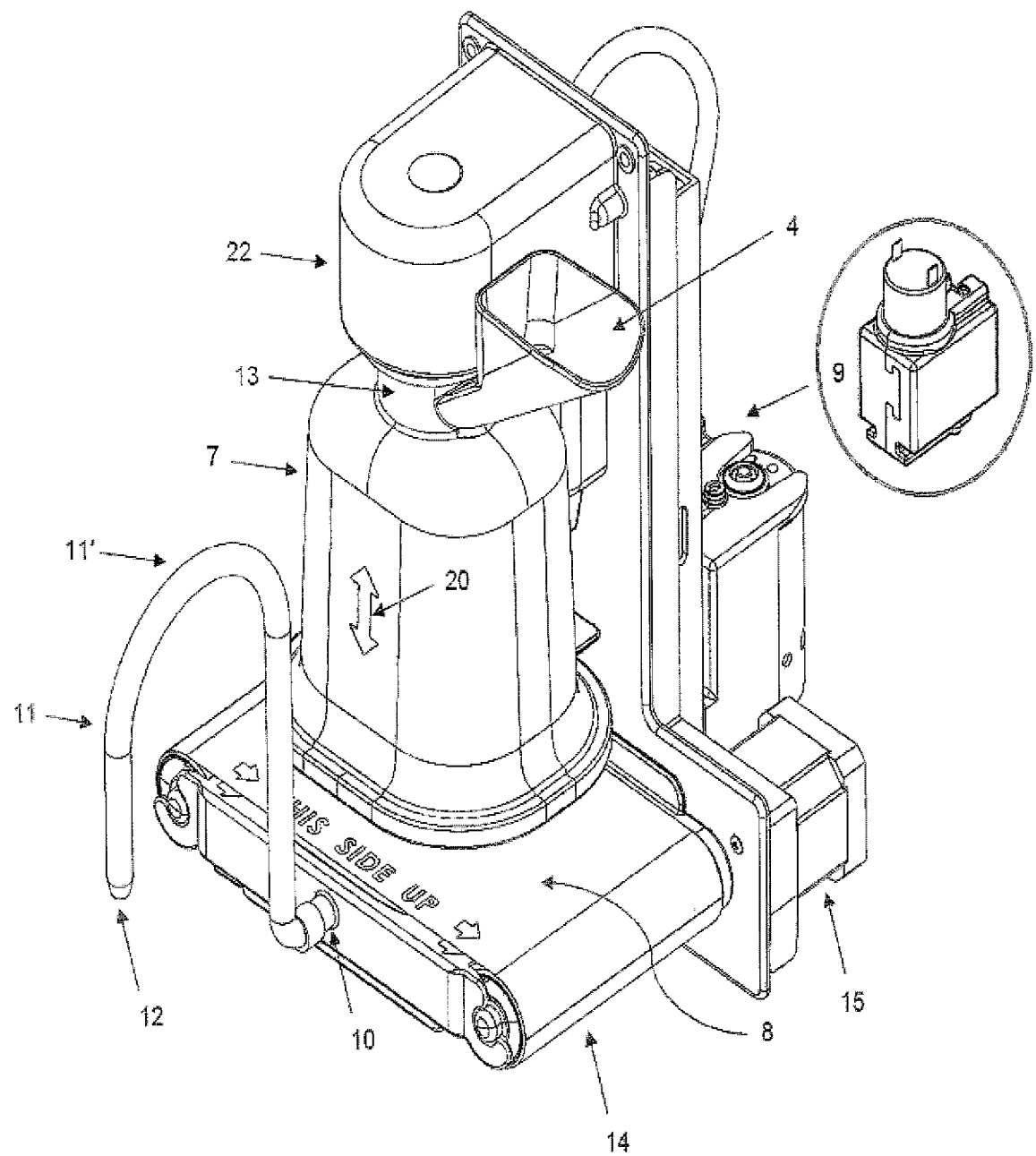
FIG. 2 is an illustration from a perspective view of various parts of the embodiment of the beverage extracting device of FIG. 1.

In FIG. 1, beverage extracting device 1 is shown to comprise canister 2 for beans, for instance coffee beans. Below canister 2 is grinder 3 that provides grinded beans to chute 4, as also shown in FIG. 2. Chute 4 also receives hot water from duct 5 that receives the hot water from heater 6 to which duct 5 is connected. The hot water ensures that the grinded beans from grinder 3 are transported and received in vessel 7 to which chute 4 connects. To accommodate one and another, vessel 7 has a closable opening at location 13 at the upper side of vessel 7 for receiving both the powder material and the hot liquid.

With reference also to FIG. 2, the closable opening is provided with a valve (not shown) at the height of arrow 13 for opening and closing of said opening, wherein the valve is arranged to provide an airtight closure of the opening of vessel 7 such that vessel 7 is enabled to be pressurized by the operation of gas pump 9. Gas pump 9 connects through duct 9' as shown in FIG. 2 to vessel 7 for supplying pressurized gas into vessel 7.

Beverage extracting device 1 also preferably comprises outlet 10, which outlet 10 is intended for release of extracted liquid at an outlet side of filter 8 which is opposite to vessel 7. Said outlet 10 connects to outlet duct 11 as shown in FIGS. 1 and 2 for the extracted liquid, wherein outlet duct 11 comprises outlet opening 12 distant from outlet 10.

Making reference now to FIGS. 3 and 4, the novel features that are proposed for suppressing splashing or sputtering at outlet opening 12 of outlet duct 11 will be discussed.

Figure 3:
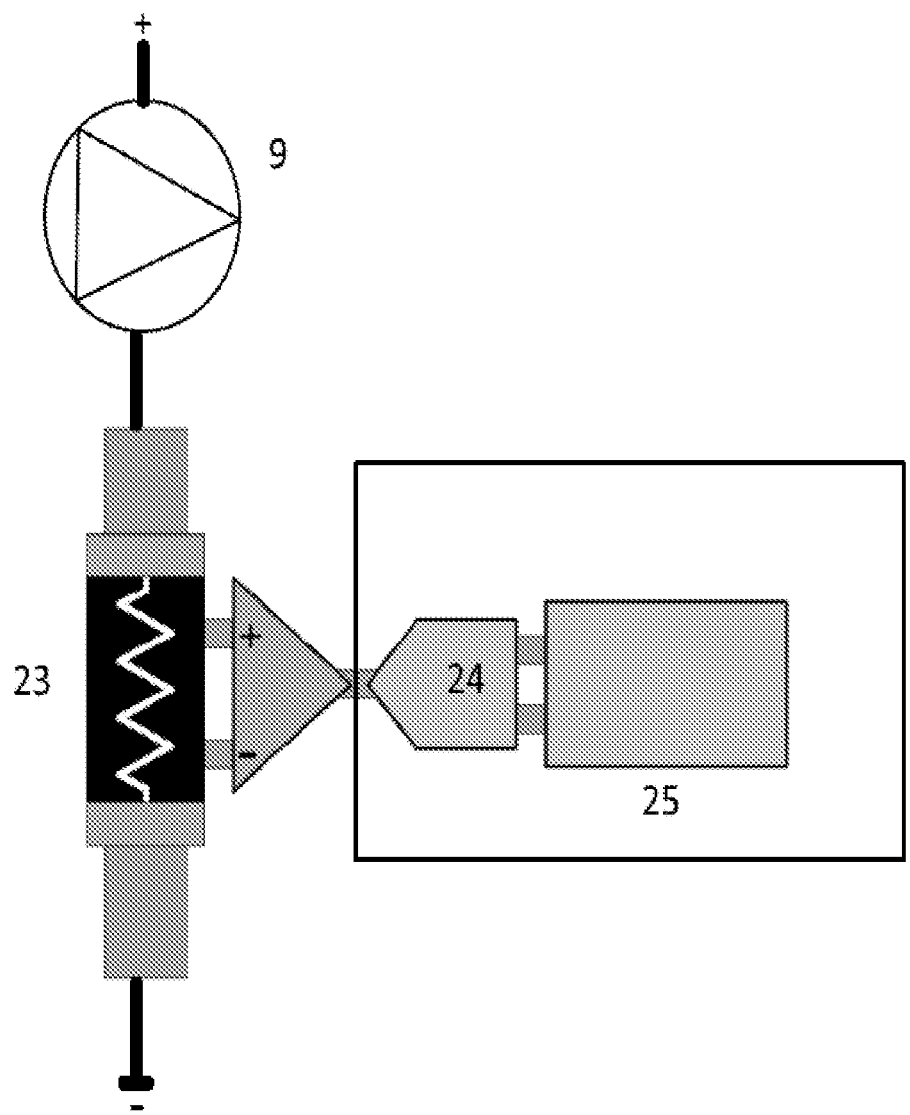
FIG. 3 is a schematic drawing of the circuitry and elements of a beverage extracting device controlling the electrical gas pump of the device, according to an embodiment of the present invention.

FIG. 3 shows that a current sensing circuit, for instance an electrical shunt E (23), connects to a power line of electrical gas pump 9 for monitoring an electrical current through electrical gas pump 9. The output of the current sensing circuit E (23) is preferably digitized by converter ADC (24) which in turn is connected to controller G (25) for detecting, amongst other functionalities as to be discussed hereafter, whether the electrical current is above a preestablished threshold. It is also possible to apply a separate detector which is then to be connected to the controller. In the shown embodiment the detector is however part of controller G (25) which has as further function to control the electrical gas pump 9. Controller G (25) is arranged to reduce power supplied to telectrical gas pump 9 when it is established that the electrical current through the electrical gas pump 9 is above the preestablished threshold. The way how this works is explained hereafter with reference to FIG. 4. FIG. 4 depicts a typical development of the electrical current through the electrical gas pump 9 during operation of beverage extracting device 1, representing on the x-axis a time-base representing samples taken from the measured electrical current, and on the y-axis the value of the electrical current supplied to electrical gas pump 9 in volts.

Figure 4:
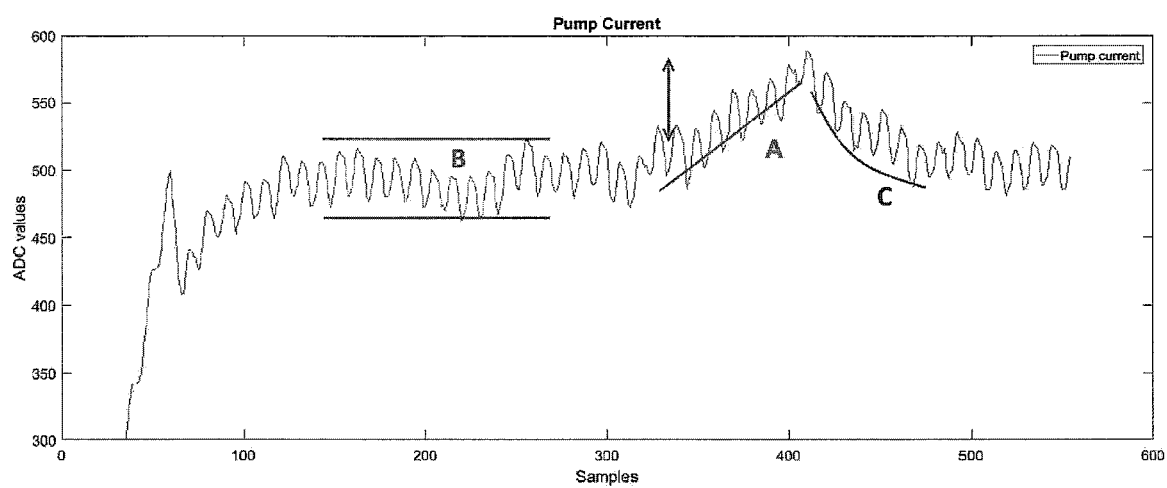
FIG. 4 shows an example of an electrical current diagram monitored during operation of the electrical gas pump of the beverage extracting device according to an embodiment of the present invention.

With reference to this FIG. 4, it is shown that the detector G (25) is arranged to establish an average current level B through electrical gas pump 9 that corresponds with an operation of device 1 wherein vessel 7 is still filled with liquid, and liquid is still regularly pouring out of outlet opening 12 of outlet duct 11. It is further indicated in the figure that when the electric current through electrical gas pump 9 rises according to line A above a certain threshold level, the power supplied to electrical gas pump 9 is reduced according to trajectory C. It follows from FIG. 4 that the preestablished threshold value where this happens is set at a value of approximately at least about 10% above the average current level B through electrical gas pump 9. By reducing the power supplied to electrical gas pump 9 in accordance with the trajectory C, sputtering and splashing at outlet opening 12 of outlet duct 11 is effectively avoided.

Desirably further the controller G (25) comprises a timer to shut off the electrical gas pump after a preestablished time period of operation.

Although the invention has been discussed in the foregoing with reference to an exemplary embodiment of the beverage extracting device of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

Note that in the specification and claims, "about" and "approximately" means within twenty percent (20%) of the numerical amount cited.

The invention claimed is:

1. A beverage extracting device comprising:
   a vessel for receiving and mixing a powder material and hot liquid;
   a filter beneath the vessel;
   an electrical gas pump that connects through a duct to the vessel for supplying pressurized gas into the vessel; and
   an outlet for extracted liquid at an outlet side of the filter which is opposite to the vessel,
   wherein the outlet connects to an outlet duct for the extracted liquid, and
   wherein a current sensing circuit connects to a power line of the electrical gas pump for monitoring an electrical current through the electrical gas pump, and
   wherein the current sensing circuit is directly or indirectly connected to a controller for detecting whether the electrical current is above a preestablished threshold, and
   wherein the controller is arranged to reduce power supplied to the electrical gas pump when the controller establishes that the electrical current through the electrical gas pump is above the preestablished threshold.

2. The beverage extracting device according to claim 1, wherein the controller is arranged to establish an average current level through the electrical gas pump that corresponds with an operation of the device wherein the vessel is still filled with liquid, and liquid is still capable of regularly pouring out of the outlet duct, and the preestablished threshold is determined depending on the level of said average current level.

3. The beverage extracting device according to claim 2, wherein the preestablished threshold is set at a value of at least about 10% above the average current level through the electrical gas pump.

4. The beverage extracting device according to claim 3, wherein the controller comprises a timer to shut off the electrical gas pump after a preestablished time period of operation.

5. The beverage extracting device according to claim 2, wherein the controller comprises a timer to shut off the electrical gas pump after a preestablished time period of operation.

6. The beverage extracting device according to claim 1, wherein the controller comprises a timer to shut off the electrical gas pump after a preestablished time period of operation.

* * * * *